Figures 1, 2:
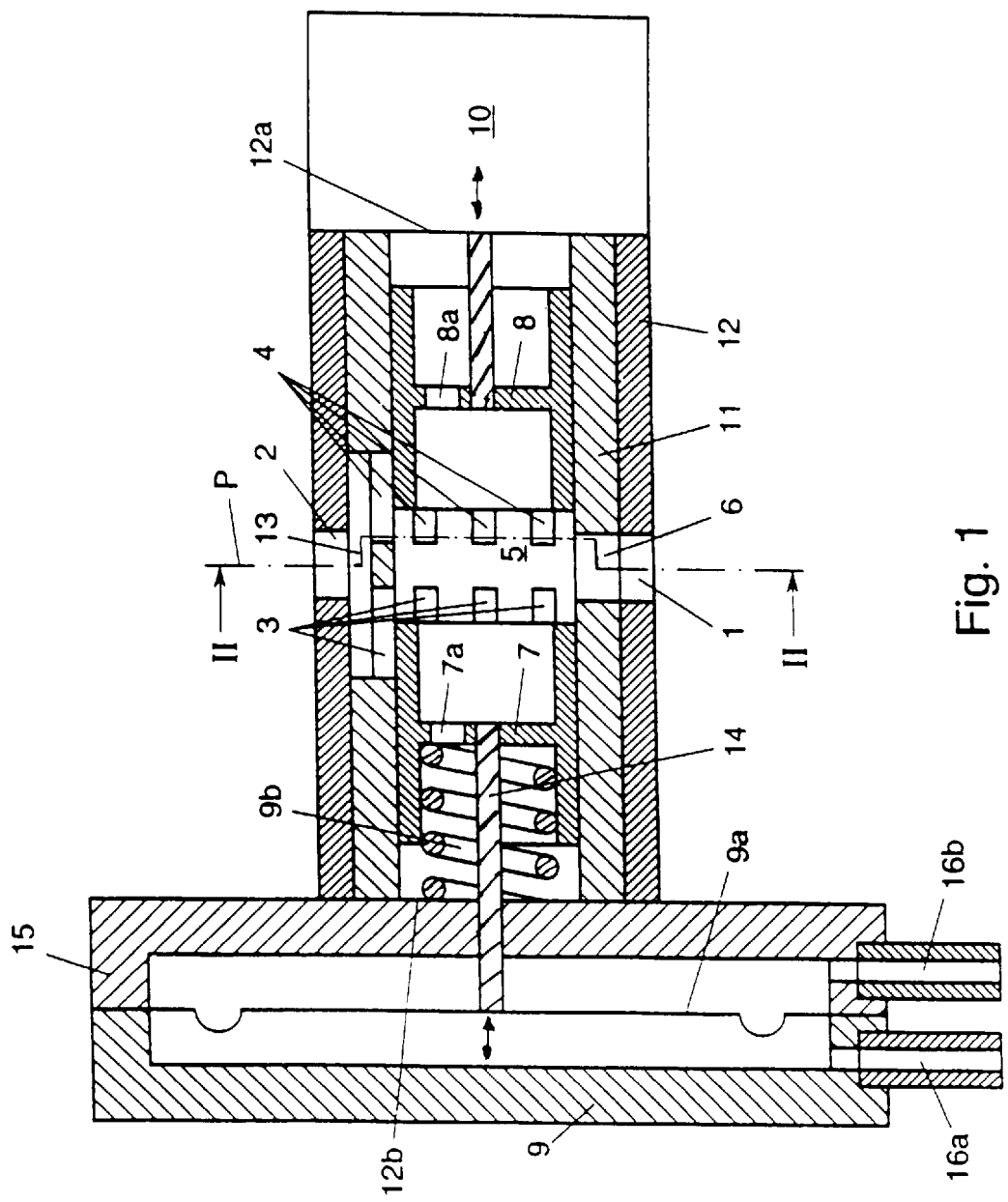

United States Patent van den Wildenberg

[11] Patent Number: 5,845,622
[45] Date of Patent: Dec. 8, 1998

[54] FLUID METERING DEVICE

[76] Inventor: Adrianus Martinus van den Wildenberg, Beekstraat 39 E, Nuenen, Netherlands, 5673 NA

[21] Appl. No.: 860,641
[22] PCT Filed: Dec. 29, 1995
[86] PCT No.: PCT/NL95/00450
§ 371 Date: Jun. 26, 1997
§ 102(e) Date: Jun. 26, 1997
[87] PCT Pub. No.: WO96/21104
PCT Pub. Date: Jul. 11, 1996

[30] Foreign Application Priority Data

Dec. 29, 1994 [NL] Netherlands ............ 9402238

[51] Int. Cl.⁶ .................................................. F02M 37/04
[52] U.S. Cl. ........................................ 123/463; 123/458
[58] Field of Search ............................ 123/451, 455, 123/198 F, 463, 458, 510

[56] References Cited

U.S. PATENT DOCUMENTS

| | | | |
|---|---|---|---|
| 4,184,465 | 1/1980 | Nakazeki | 123/463 |
| 4,459,952 | 7/1984 | Holstein | 123/198 F |
| 4,469,070 | 9/1984 | Rassey | 123/462 |
| 4,492,191 | 1/1985 | Aoki | 123/198 F |
| 4,604,981 | 8/1986 | Dazzi | 123/451 |
| 4,615,322 | 10/1986 | Dazzi | 123/451 |
| 4,664,084 | 5/1987 | Wheelock | 123/462 |
| 5,341,785 | 8/1994 | Meaney | 123/462 |
| 5,479,899 | 1/1996 | Phelps | 123/463 |

FOREIGN PATENT DOCUMENTS 721262  1/1955  United Kingdom ............ 123/451

*Primary Examiner*—Carl S. Miller
*Attorney, Agent, or Firm*—Kinney & Lange, P.A.

[57] ABSTRACT

A fluid metering device, for instance for a fuel supply system of a combustion engine having combustion chambers, which fluid metering device comprises at least one supply line connection (1) and at least one discharge line connection (2), the fluid metering device being provided with two sets of outlet ports (3, 4) which put the or each discharge line connection (2) into fluid communication with a fluid chamber (5), which fluid chamber (5) is put into fluid communication, via at least one inlet port (6), with the at least one supply line connection (1), a first and a second regulating plunger (7 and 8 respectively) controlling the fluid flow rate through, respectively, the first and the second set of outlet ports (3 and 4 respectively) by covering at least partly the through-flow surface of, respectively, the first and the second set of outlet ports (3 and 4 respectively), each regulating plunger (7, 8) comprising energizing means (9 and 10 respectively) of its own for controlling the respective positions of the regulating plungers (7, 8).

11 Claims, 1 Drawing Sheet

FLUID METERING DEVICE

The invention relates to a fluid metering device according to the preamble of claim 1.

In general, the flow rate is controlled with a single control valve whose orifice can be varied continuously. Such a control has a number of drawbacks. When there is for instance the need to control the flow rate of the valve on the basis of more than one quantity, this is only possible in an electronic manner. This entails the drawback that the control characteristic of the valve in respect of one quantity should generally be different from the control characteristic in respect of another quantity. For example, one quantity may require a very fine, rapid control, whereas, by contrast, the other quantity on the basis of which control takes place requires a slow control characteristic, whereby great variations in flow rate are realized.

The control characteristic of the valve is not only determined by the shape of the valve port, but also by the energizing means by means of which the valve is adjusted. Also in respect of the energizing means, with the known fluid metering devices a compromise should in each case be reached between the requirements set by the different quantities on the basis of which the flow rate is controlled. For instance, energizing means that have to be able to realize a small adjustment in a rapid manner will, constructionally, differ completely from energizing means that have to be able to realize a great adjustment at a low speed.

The realization of different control characteristics for different quantities is not possible with a normal control valve, as a consequence of which, for controlling the flow rate in conventional systems, fluid pressure control by means of, for instance, a pressure regulator is resorted to. However, such a fluid pressure control for a flow control on the basis of a first quantity disturbs the flow control by means of the valve on the basis of a second quantity.

The object of the invention is to provide a fluid metering device without the aforementioned drawbacks. Hence, a fluid metering device having different control characteristics.

To this end, the fluid metering device of the type mentioned in the preamble is characterized by the characterizing features of claim 1.

Because of the presence of two separate regulating plungers, each being controlled by energizing means of its own, the control characteristics can be properly adapted to the quantity on the basis of which the position of the regulating plunger is controlled. That is to say, the shape and dimensions of the outlet ports can be adapted to the desired control behavior and for the choice of the energizing means, the desired control behavior for the relevant quantity can be taken into account as well. On the other hand, it is also possible to control the position of the two regulating plungers on the basis of only one quantity measured, with one regulating plunger serving for the coarse adjustment and the other regulating plunger realizing the fine adjustment.

In a further elaboration of the invention, which is in particular suitable when the fluid metering device is not only intended for controlling the flow rate output, but also serves to distribute a single flow stream over a number of different flow streams, the fluid metering device is characterized by the features of claim 2.

A fluid metering device of such design can be of a compact construction and can be manufactured in an economical manner.

Further elaborations of the invention are described in subclaims and will be specified hereinafter with reference to the accompanying drawing, wherein:

FIG. 1 shows a section taken on line I—I in FIG. 2; and
FIG. 2 shows a section taken on line II—II in FIG. 1.

The fluid metering device shown in the drawing is intended to form a part of a fuel supply system of an internal combustion engine provided with combustion chambers, such as for instance cylinders. The exemplary embodiment shown in intended for the fuel supply system of a combustion engine having seven or fewer cylinders and comprises one supply line connection 1 and seven discharge line connections 2. If necessary, one or more of the discharge line connections can be closed off by means of a plug when the fluid metering device is utilized with fewer than seven cylinders. With such multi point utilizations, the number of discharge line connections 2 corresponds to the number of combustion chambers of the combustion engine. It is understood that the number of discharge line connections 2 can be varied depending on the number of combustion chambers of the combustion engine. There may even be involved only one discharge line connection when, for instance, a single point injection system is used. It may also be understood that the number of supply line connections 1 may be greater than one. For instance when the fluid metering device is connected to two supply lines which each supply a different type of fuel. Generally, it will apply that the number of fluid supply line connections corresponds to the number of different fluid supply sources.

The fluid metering device according to the exemplary embodiment shown further comprises two sets of outlet ports 3, 4, which bring each discharge line connection 2 into fluid communication with a fluid chamber 5. Via one inlet port 6, the fluid chamber 5 is brought into fluid communication with the supply line connection 1. A first and a second regulating plunger 7 and 8 respectively control the fluid flow rate of the fluid metering device by at least partly covering the through-flow surface of the first and second sets of outlet ports 3, 4 respectively. In order to be able to control the fluid flow rate of the first set of outlet ports 3 independently of the fluid flow rate of the second set of outlet ports 4, each regulating plunger 7, 8 has energizing means 9 and 10 respectively of its own for controlling the respective positions of the regulating plungers 7, 8.

The fluid chamber 5 is bounded by a bush 11 which has its surface provided with the inlet port 6 at a radial plane P thereof. Viewed in axial direction of the bush 11, these sets of outlet ports 3, 4 are provided on both sides of the radial plane P. In the exemplary embodiment, the outlet ports 3, 4 of each set are arranged so as to be distributed over the circumference of the bush 11. The respective regulating plungers 7, 8 are fittingly and slidably accommodated in the bush 11 and are located on both sides of the radial plane P.

In turn, the bush 11 is fittingly accommodated in a bore of a housing 12, which housing 12 has its surface provided with the above-mentioned supply line connection 1 which is in direct fluid communication with the associated inlet port 6 in the bush 11. The housing 12 further comprises a number of discharge line connections 2 which are arranged so as to be distributed over the surface and which each debouch into a chamber 13 associated with the relevant discharge line connection 2. In the exemplary embodiment, the chamber is formed in the outer surface of the cylindrical bush 11. It is however understood that this chamber 13 may also be formed in the inner surface of the cylindrical bore of the housing 12. Hence, the chambers 13 are also arranged so as to be distributed over the circumference of the surface of either the bore of the housing 12 or the bush 11. Each chamber 13 is in direct fluid communication with an outlet port 3 of the first, and an outlet port 4 of the second set.

Hence, in each case, the outlet ports 3, 4 of the two sets debouch in pairs into a common chamber 13 from where the fluid is further discharged in one flow via a discharge line connection 2. It is understood that such a construction is not necessary and that the fluid flows coming from the two sets of outlet ports 3, 4 may also be discharged separately.

In the compact embodiment which can be manufactured in an economical manner and which is shown in the drawing, the energizing means 9, 10 of the respective regulating plungers 7, 8 are located on both sides of the housing 12 at the end faces 12a, 12b of the bore in the housing 12. Viewed in axial direction of the bore, the supply line and discharge line connections 1 and 2 respectively are located substantially centrally in the housing 12, at the radial plane P.

As the end faces 12a, 12b of the bush 11 are closed in a fluid tight manner, the regulating plungers 7, 8 are provided with a fluid passage 7a, 8a to prevent undesired fluid pressure build-up in parts of the fluid chamber 5 caused by displacement of the regulating plungers 7, 8. Such a pressure build-up in the fluid chamber 5 could disturb the metering of the fluid. A much more important drawback would be that without the presence of the fluid passages 7a, 8a, the space between the energizing means 9, 10 and the respective regulating plungers 7, 8 would be a closed-off space wherein a pressure build-up would take place, which would have to be overcome through the energizing means 9, 10. By means of the fluid passages 7a, 8a, it is provided that the pressure on both sides of the regulating plungers 7, 8 always remains equal, as a result of which the forces exerted by the fluid pressure on the regulating plungers 7, 8 in opposite directions are practically equal. The forces are not completely equal, because the surface on which fluid pressure is exerted on the sides of the regulating plungers 7, 8 which face the drive gear 9, 10 is slightly smaller because of the presence of the control rods 14. Another, third advantage of the fluid passages 7a, 8a is that they can impart a fluidal damping to the regulating plungers 7, 8 in the fashion of a shock absorber.

The two regulating plunger-energizing means 9, 10 can be of a different type, allowing the desired driving characteristic to be precisely adapted to the desired control characteristic aimed at with the relevant regulating plunger 7, 8 and the associated set of outlet ports 3, 4 respectively. In the exemplary embodiment shown, the energizing means 9 for the first regulating plunger 7 is of a pneumatic design. For this purpose, it comprises a diaphragm 9a with a spring 9b by means of which the position of the first regulating plunger 7 is controllable depending on an air flow in, for instance, the air supply of a combustion engine. In this manner, for instance pressure differences in the air flow which are generated by means of a venturi, an orifice meter or a Pitot tube can serve to control the diaphragm 9a. The diaphragm 9a is connected to the regulating plunger 7 via a control rod 14. The diaphragm is located in a closed housing 15 into which, on both sides of the diaphragm, channels 16a, 16b debouch, by means of which channels 16a, 16b the generated pressure differences in the air flow are transmitted to the diaphragm 9a.

The energizing means 10 for the second regulating plunger 8 is of an electromechanical, electrohydraulic or electropneumatic design. The control of these energizing means can for instance take place by means of micro-electronic devices which provide control signals to the electromechanical, electrohydraulic or electropneumatic energizing means 10. The control signals can for instance be dependent on measurements coming from a lambda probe in the exhaust of the engine. An important advantage of such a combination of energizing means 9, 10 is that if the micro-electronic devices which provide the control of the electromechanical, electrohydraulic or electropneumatic energizing means 10 falls out, the fuel supply still takes place, albeit in a slightly less sophisticated manner, through the presence of the pneumatic energizing means 9 not depending on electronic devices.

However, for specific applications, it is also very well possible that the energizing means 9, 10 for the first and the second regulating plunger 7, 8 are of the same type.

It is also possible that the two regulating plungers 7, 8 are controlled on the basis of the same quantity measured, but that one regulating plunger 7 serves for the coarse adjustment, while the other regulating plunger 8 serves for the fine adjustment of the fluid supply.

Such a distinction in coarse adjustment and fine adjustment for the respective regulating plungers 7, 8 can inter alia be realized because the shape and/or dimensions of the outlet ports 3 associated with the first set differ from the shape and/or dimensions of the outlet ports 4 associated with the second set.

It is understood that the invention is not limited to the exemplary embodiment described, but that various modifications are possible within the framework of the invention.

I claim:

1. A fluid metering device, for instance for a fuel supply system of a combustion engine having combustion chambers, said fluid metering device comprising at least one supply line connection, at least one discharge line connection, and two outlet ports which put the or each discharge line connection into fluid communication with a fluid chamber, said fluid chamber being put into fluid communication, via at least one inlet port, with the at least one supply line connection, a first and a second regulating valve controlling the fluid flow rate through the first and the second outlet port, wherein each regulating valve comprises energizing means of its own for controlling the respective positions of the regulating valves, characterized in that, the fluid metering device comprises two sets of outlet ports all of which create a combined flow volume which is simultaneously sent from the fluid chamber to the or each discharge line connection, wherein the first and second valve comprise a first and second plunger respectively controlling the fluid rate through, respectively the first and the second set of outlet ports by covering at least partly the through-flow surface of, respectively, the first and the second set of outlet ports by means of respectively the outer cylindrical surface of the first plunger and the outer cylindrical surface of the second plunger.

2. A fluid metering device according to claim 1, characterized by a bush bounding the fluid chamber and having its surface provided with the at least one inlet port at a radial plane, said sets of outlet ports, viewed in axial direction of the bush being provided on both sides of the radial plane, the outlet ports of each set being arranged so as to be distributed over the circumference of the bush, the respective regulating plungers being fittingly and slidably accommodated in the bush and the regulating plungers, viewed in axial direction of the bush, being located on both sides of the radial plane.

3. A fluid metering device according to claim 2, characterized in that the bush (11) is fittingly accommodated in a bore of a housing, said housing having its surface provided with at least one supply line connection which is in direct fluid communication with the associated inlet port, said housing further comprising a number of discharge line connections which are arranged so as to be distributed over the surface and which each debouch into a chamber associated with the relevant discharge line connection, said chamber being formed in the inner surface of the cylindrical bore of the housing or in the outer surface of the cylindrical bush and being in direct fluid communication with an outlet port of the first, and an outlet port of the second set.

4. A fluid metering device according to claim 3, characterized in that energizing means of the respective regulating plungers are located on both sides of the housing at the end faces of the bore in the housing, the supply line and discharge line connections, viewed in axial direction of the bore, being located substantially centrally in the housing, at said radial plane.

5. A fluid metering device according to claim 1, characterized in that the two regulating plunger energizing means are of different types.

6. A fluid metering device according to claim 5, characterized in that the energizing means for the first regulating plunger is of a pneumatic design, and comprises a diaphragm with a spring by means of which the position of the first regulating plunger is controllable depending on an air flow in, for instance, the air supply of the combustion engine, said air flow being measured by means of a venturi, an orifice meter or a Pitot tube, the energizing means for the second regulating plunger being of an electromechanical, electrohydraulic or electropneumatic design.

7. A fluid metering device according to claim 1, characterized in that the energizing means for the first and the second regulating plunger are of the same type.

8. A fluid metering device according to claim 1, characterized in that the shape and/or dimensions of the outlet ports associated with the first set differ from the shape and/or dimensions of the outlet ports associated with the second set.

9. A fluid metering device according to claim 1, characterized by one supply line connection and a number of discharge line connections, the number of which corresponds to the number of combustion chambers of the combustion engine.

10. A fluid metering device according to claim 1, characterized by a number of supply line connections corresponding to the number of different fluid supply sources.

11. A fluid metering device according to at least claim 3, characterized in that the end faces of the bush are closed off in a fluid-tight manner, the regulating plungers being provided with a fluid passage to prevent undesired fluid pressure build-up in parts of the fluid chamber and to equalize pressure differences on both sides of the respective regulating plungers.

* * * * *